Patented Mar. 19, 1935

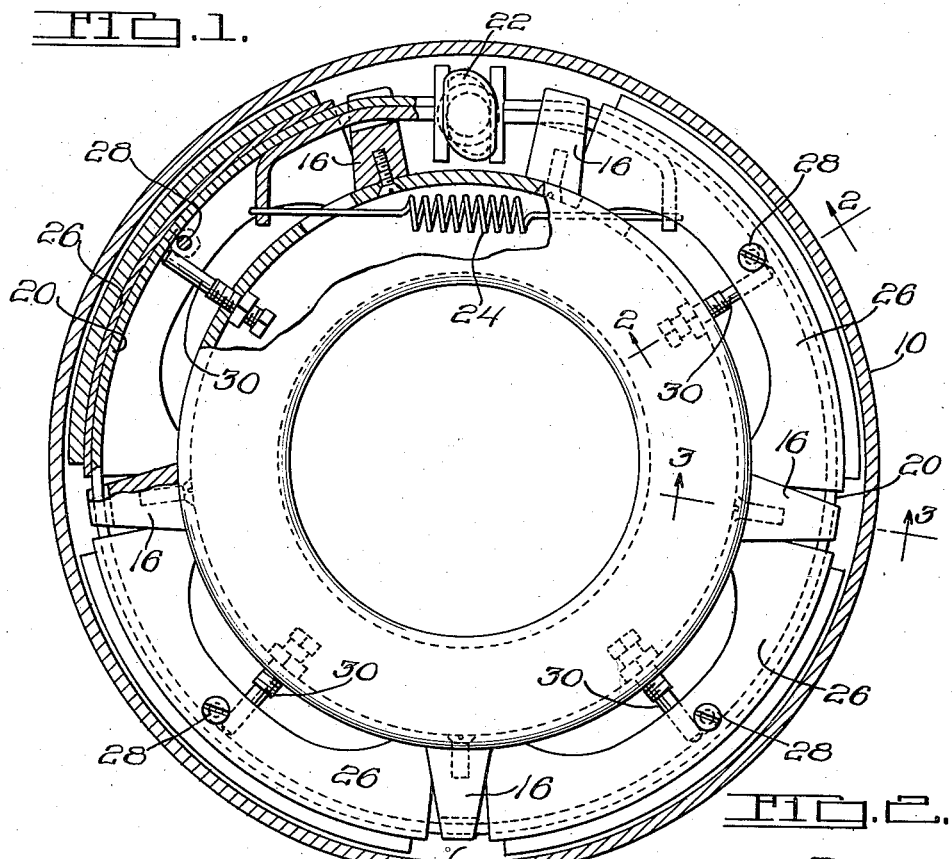

1,994,813

UNITED STATES PATENT OFFICE 1,994,813

BRAKE

Adiel Y. Dodge, South Bend, Ind., assignor to Bendix Brake Company, South Bend, Ind., a corporation of Illinois Application May 23, 1928, Serial No. 279,883

21 Claims. (Cl. 188—78)

This invention relates to brakes, and is illustrated as embodied in an internal expanding automobile brake. An object of the invention is to provide a simple and powerful brake which can be constructed inexpensively in large quantities.

In one desirable arrangement, there are a plurality of friction shoes or their equivalents, operated by expansion of a continuous flexible band or the like, illustrated as operated by a double cam arranged between its ends. I prefer that these shoes be allowed to float, with fixed anchor abutments at their ends, which abutments may also serve to support the band when the brake is released.

Other features of novelty relate to novel positioning devices for the band, to the formation of the backing plate to support the shoes, and to other novel and desirable details of construction which will be apparent from the following description of one illustrative embodiment shown in the accompanying drawing, in which:

Figure 1 is a vertical section through the brake, just inside the head of the brake drum, and showing the friction means in side elevation;

Figure 2 is a partial radial section on the line 2—2 of Figure 1, showing one of the positioning devices;

Figure 3 is a similar section, on the line 3—3 of Figure 1, through one of the abutments; and Figure 4 is a side elevation of one of the shoes.

The brake includes a rotatable drum 10, at the open side of which is a novel backing plate 12 closing the drum and extending across the braking flange of the drum, and which is drawn inwardly of the drum to provide a cylindrical supporting portion 14. Secured in the angle between portion 14 and the outer straight portion of the plate, is a series of novel wedge-shaped anchor abutments 16, fixedly secured by screws 18 or in any other desired manner.

Abutments 16 are formed on their outer ends with recesses receiving an expansible operating member, such as a continuous steel band 20 having separable ends forced apart to apply the brake by means such as a double cam 22 acting against the resistance of a return spring 24. Band 20 or it equivalent operates friction means such as a series of floating channel-shaped shoes 26, each arranged between two of the abutments 16 and anchoring at one end on one of the abutments when the drum is turning in one direction and at the other end on the other abutment when the drum is turning in the other direction. Band 20 extends through the channels of the shoes, and is loosely connected to the shoes to form a connected subassembly by means such as a series of pins 28 connecting the side flanges of the shoes back of band 20.

The idle position of band 20, that is the position with the brake released, is determined by a series of adjustable devices such as setscrews 30 threaded through portion 14 of the backing plate and adjustable from the outside of the backing plate. When the brake is released, the setscrews engage the inner face of the band 20.

While one illustrative embodiment has been described in detail, it is not my intention to limit the scope of the invention to that particular embodiment, or otherwise than by the terms of the appended claims.

I claim:

1. A brake comprising, in combination, a series of fixed anchor abutments having recesses on their outer faces, an expansible band encircling said series and seated in said recesses.

2. A brake comprising, in combination, a series of fixed anchor abutments having recesses on their outer faces and an expansible band encircling said series and seated in said recesses, and a series of shoes engaged by said band and each arranged between two of the abutments.

3. A brake comprising, in combination, a series of channel-shaped shoes, and an expansible band extending through the channels of said shoes.

4. A brake comprising, in combination, a series of channel-shaped shoes, and an expansible band extending through the channels of said shoes, together with an adjustable positioning stop opposite each shoe and engaging the face of the band opposite the shoe when the brake is released.

5. A brake comprising, in combination, a series of channel-shaped shoes, and an expansible band extending through the channels of said shoes, together with a threaded setscrew opposite each shoe and engaging the face of the band opposite the shoe when the brake is released.

6. A brake comprising, in combination, a series of channel-shaped floating shoes, a fixed abutment adjacent and engageable by each end of each shoe, together with a mechanically-actuated expansible mechanical device arranged in the channels of and engaging said shoes and adapted to force the same into drum engagement.

7. A friction brake comprising, in combination, a rotatable drum providing a cylindrical surface, a plurality of substantially rigid shoes closely spaced in end-to-end relation and positioned for braking engagement with the same zone of said surface, a plurality of annularly spaced non-rotatable devices each disposed between the adjacent ends of two of said shoes and operable to permit of bodily radial movement of the individual shoes and each adapted to hold one of said shoes against rotation by the drum in one direction and the other shoe against rotation of the drum in the other direction, and a flexible metal band extending parallel to said drum surface and capable of expanding and contracting movement to actuate said shoes.

8. A friction brake comprising, in combination, a rotatable drum, a plurality of substantially rigid arcuate shoes arranged in end-to-end relation adjacent a peripheral surface of said drum, a flat metal band cooperating with all of said shoes on the side thereof opposite said drum surface and operable by a change in its curvature to press said shoes against said surface, a plurality of non-rotatable devices operable upon the individual shoes to resist endwise movement thereof, and means for applying an actuating force directed longitudinally of said band whereby to change the curvature of the band.

9. A friction brake comprising, in combination, a rotatable drum, a flexible metal band extending parallel to a peripheral surface on said drum and resiliently shaped so as to possess an inherent tendency to move radially away from said drum surface, a plurality of shoes interposed between said band and said surface and adapted to be actuated in the expansion and contraction of said band, means operating to hold said shoes against rotation when engaging said drum surface, and operating means by which the said band may be placed under endwise stress thereby controlling the expansion and contraction thereof.

10. A friction brake comprising, in combination, a drum, a plurality of segmental brake elements arranged in end-to-end relation around the internal circumference of said drum and providing a vacant sector on one side of said drum, means for holding said shoes against endwise movement when engaging the drum but permitting of individual movement of the shoes against the drum, a flexible actuating member extending circumferentially around said shoes on the inside thereof, said member having adjacent end portions extending into said sector, and means associated with said end portions and operable to spread said end portions apart whereby to expand said member and press said shoes against the drum surface.

11. A friction brake comprising, in combination, rotatable means providing a cylindrical surface, a plurality of shoes arranged in end-to-end relation around said surface and leaving a vacant sector between the terminal shoes, means associated with the individual shoes for preventing endwise movement thereof, a flexible metal band encircling said shoes and having end portions projecting beyond the ends of said terminal shoes and located adjacent each other within said vacant sector, the peripheral surface of said band being adapted for engagement with said shoes on the side thereof opposite said rotatable surface, and a cam member mounted in said sector for oscillation about a fixed axis extending parallel to and spaced from the axis of said rotatable means, said cam member being associated with said end portions and operable upon oscillation in either direction to cause relative motion between the end portions whereby to change the diameter of said band.

12. A friction brake comprising, in combination, means providing an internal cylindrical surface, a plurality of segmental shoes arranged in end-to-end relation around said surface, individual shoe guides operating to hold said shoes against rotation but permitting of bodily radial movement thereof, flexible actuating means extending parallel to said surface on the inner side of said shoes and having adjacent separable end portions, and means operable to place said actuating means under longitudinal compression including an oscillatory cam extending in a radial direction when in brake-released position and operable upon angular movement in either direction to spread said end portions apart.

13. An expanding friction brake comprising, in combination, a rotatable drum, a flexible metal member extending a substantial distance circumferentially around the internal cylindrical surface of said drum in spaced relation thereto, a plurality of non-rotatable segmental shoes interposed between said surface and said member to permit of movement of said member relative thereto, and operating means by which said member may be placed under longitudinal compression whereby to expand and press said elements against said drum surface.

14. An expanding friction brake comprising, in combination, rotatable means providing an internal cylindrical surface, a plurality of segmental brake elements arranged in end-to-end relation around a portion of said surface, means operable on said elements individually to hold them against rotation when engaging said surface, radially expansible means located within said elements for pressing them uniformly against said surface, said expansible means being capable of withstanding a compressive force applied circumferentially thereof, and operating means for exerting such force whereby to press said elements against said drum surface.

15. A friction brake comprising, in combination, a rotatable drum, a plurality of segmental brake elements arranged in end-to-end relation adjacent a peripheral surface of said drum, an arcuate metal band arranged for lateral engagement with said elements and operable upon a change in its curvature to yieldably urge said elements into braking engagement with said surface, means independent of said band operable to hold said elements against rotational movement but permitting of individual movement to uniformly distribute to said shoes the pressure applied by the band, and operating means by which the curvature of said band may be changed.

16. A friction brake comprising, in combination, rotatable means providing a cylindrical surface, a strip of flexible material extending around a portion of said surface in parallel spaced relation thereto, a plurality of segmental brake elements of substantially greater rigidity than said strip interposed between the strip and the surface, means independent of said strip for resisting circumferential movement of said elements when pressed against said surface by said strip, and actuating means operable to effect a circumferential movement of a portion of said strip relative to said elements whereby to change the curvature of said strip and thereby cause said strip to yieldably urge said elements against said surface with uniform pressure.

17. A friction brake comprising, in combination, rotatable means providing a cylindrical surface, a plurality of shoes mounted in end-to-end relation around said surface for individual movement toward and away from said surface, means operable to exert an actuating force at a point adjacent said surface, and an elongated flexible member adapted to receive said force at a single point of application and by lateral flexure to distribute said force uniformly to all of said shoes.

18. A friction brake comprising, in combination, rotatable means providing a cylindrical braking surface, friction means for engaging said surface, means acting at a plurality of points around said friction means for preventing circumferential movement thereof while engaging said braking surface, and actuating means associated with said friction means on the side thereof opposite said braking surface and operable by circumferential movement relative to the friction means to yieldably exert a braking pressure thereon.

19. A brake comprising a series of floating shoes having anchoring devices engaged by the respective shoes, and an expansible metallic band inside of the shoes and operable to force them outwardly to apply the brake.

20. A brake comprising a drum having a cylindrical braking flange and a backing plate pressed from sheet metal and of substantially uniform thickness arranged at the open side of the drum and having (1) an outer peripheral zone in a plane substantially perpendicular to the braking flange, (2) a portion drawn into a cylinder coaxial with and arranged within said flange, and (3) another portion in said perpendicular plane integrally connected with said cylinder at the edge opposite the peripheral zone.

21. A stamped backing plate having an annular groove pressed therein and with its outer wall in the form of a cylinder adapted to be arranged coaxially within the braking flange of a brake drum.

ADIEL Y. DODGE.